US005508842A

United States Patent [19]
Takeda et al.

[11] Patent Number: 5,508,842
[45] Date of Patent: Apr. 16, 1996

[54] OPTICAL AMPLIFIER

[75] Inventors: Keiko Takeda, Yokohama; Sakae Yoshizawa; Sinya Inagaki, both of Tokyo; Kazuya Sasaki, Mitaka; Kenji Tagawa, Tokyo, all of Japan

[73] Assignee: Fujitsu Limited, Kawasaki, Japan

[21] Appl. No.: 259,133

[22] Filed: Jun. 13, 1994

Related U.S. Application Data

[63] Continuation of Ser. No. 689,890, filed as PCT/JP90/01499, Nov. 16, 1990, abandoned.

[30] Foreign Application Priority Data

Nov. 20, 1989 [JP] Japan ................................. 1-299712

[51] Int. Cl.⁶ .......................... H01S 3/30; G02B 6/26
[52] U.S. Cl. .................... 359/341; 359/174; 359/337; 372/66; 385/124
[58] Field of Search .................... 359/134, 160, 359/174, 341, 345, 337; 385/5, 43, 96, 124; 372/6, 66, 70, 71, 40; 501/98

[56] References Cited

U.S. PATENT DOCUMENTS

| | | | |
|---|---|---|---|
| 4,161,944 | 7/1979 | Muckerheide | 359/341 |
| 4,554,510 | 11/1985 | Shaw et al. | 372/6 |
| 4,653,056 | 3/1987 | Baer et al. | 372/27 |
| 4,739,507 | 4/1988 | Byer | 372/22 |
| 4,867,518 | 9/1989 | Stamnitz et al. | 359/174 |
| 4,941,726 | 7/1990 | Russell et al. | 372/6 |
| 4,955,025 | 9/1990 | Mears et al. | 372/6 |
| 5,007,698 | 4/1991 | Sasaki et al. | 359/341 |
| 5,048,026 | 9/1991 | Shaw et al. | 385/5 |
| 5,058,974 | 10/1991 | Mollenauer | 385/27 |

FOREIGN PATENT DOCUMENTS

| | | |
|---|---|---|
| 61-14624 | 1/1986 | Japan . |
| 0107690 | 5/1991 | WIPO . |

OTHER PUBLICATIONS

O Plus E, No. 113, 1989, pp. 75–82.
B. J. Ainslie et al., "Fabrication and Optimisation of the Erbium Distribution in Silica Based Doped Fibres", *Fourteenth European Conference On Optical Communication (ECOC '88)*, Part I, pp. 62–65, Sep. 11, 1988, London, GB.

*Primary Examiner*—Nelson Moskowitz
*Attorney, Agent, or Firm*—Staas & Halsey

[57] ABSTRACT

In an optical amplifier for amplifying a signal light by propagating the signal light and a pumping light in a rare earth element doped fiber doped with a rare earth element, a diameter of a rare earth element doped portion of the rare earth element doped fiber is gradually reduced in a direction of propagation of the pumping light. With this construction, an adverse rare earth element doped area which does not contribute to optical amplification, but rather attenuates the pumping light, can be eliminated to thereby provide an optical amplifier having increased amplification efficiency.

12 Claims, 7 Drawing Sheets

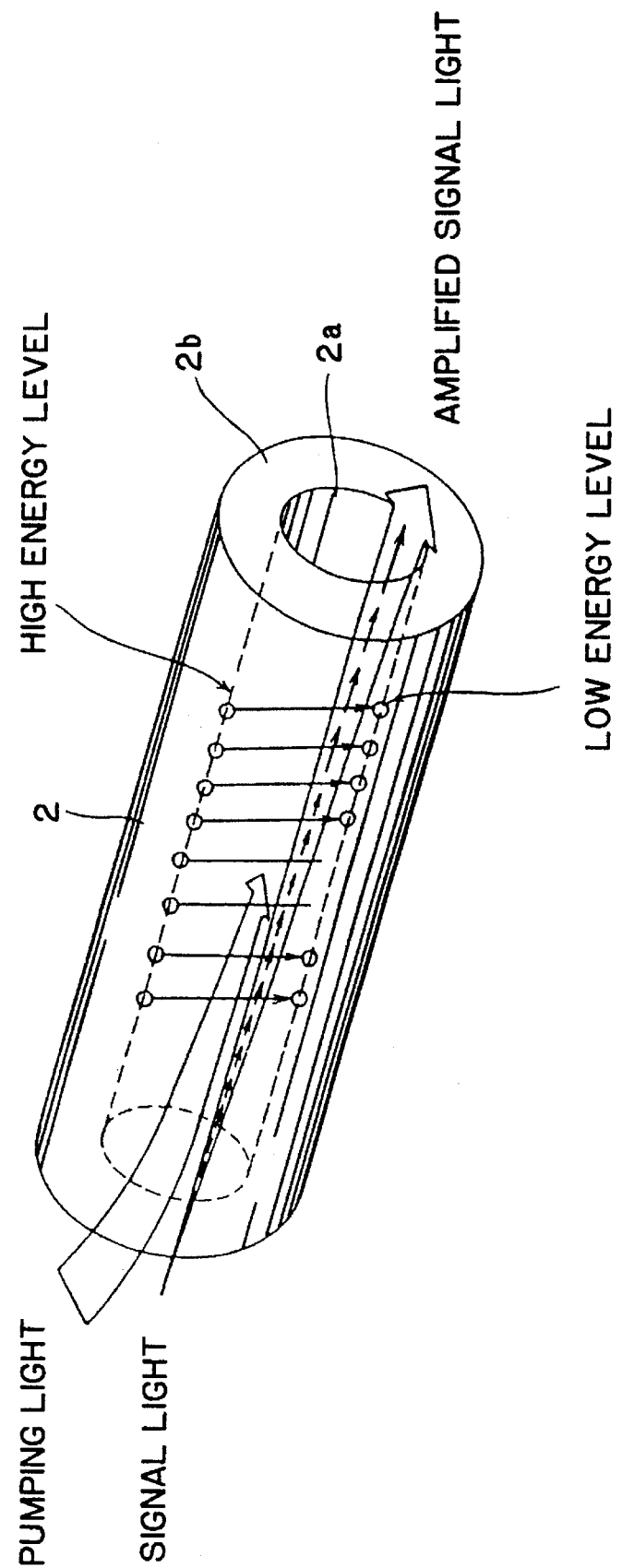

OPTICAL AMPLIFIER

This application is a continuation, of application Ser. No. 07/689,890, filed as PCT/JP90/01499 Nov. 16, 1990, now abandoned.

BACKGROUND OF THE INVENTION

1. Field of the Invention

The present invention relates to an optical amplifier employing a rare earth element doped fiber or a rare earth element doped optical waveguide doped with a rare earth element.

2. Description of the Related Art

In optical communication systems used at present, a repeater is inserted at fixed distance intervals, so as to compensate the attenuation of an optical signal due to a power loss of an optical fiber. The repeater is constructed in such a manner that the optical signal is converted into an electrical signal by a photodiode followed by amplification of the electrical signal by means of an electronic amplifier. Thereafter the electrical signal thus amplified is converted into an optical signal by means of a semiconductor laser or the like followed by returning the optical signal to an optical transmission line, if the optical signal can be directly amplified with a low noise without conversion into an electrical signal, the optical repeater can be made compact and economized.

In this circumstance, much research has been undertaken to develop an optical amplifier capable of directly amplifying an optical signal. The optical amplifiers which are the subject of this research are generally classified into (a) an optical amplifier employing, in combination, an optical fiber doped with a rare earth element (Er, Nb, Yb, etc.) and a pumping light; (b) an optical amplifier employing a semiconductor laser doped with the rare earth element; and (c) an optical amplifier utilizing a nonlinear effect in the optical fiber.

Above all, the optical amplifier employing the combination of the rare earth element doped fiber and the pumping light, as mentioned in the above type (a), has excellent features, such as no polarization dependency, low noise, and small coupling loss to a transmission line. Accordingly, the optical amplifier of this type is expected to remarkably increase a repeating distance in an optical fiber transmission system, and it is also expected to enable multiple distributions of the optical signal.

FIG. 1 shows the principle of the optical amplification by the rare earth element doped fiber. Referring to FIG. 1, reference numeral 2 designates an optical fiber constructed of a core 2a and a clad 2b. Erbium (Er) is doped in the core 2a. When a pumping light is input into the Er doped fiber 2, Er atoms are excited up to a high energy level. When a signal light is input into the optical fiber 2 having Er atoms excited up to the high energy level, the Er atoms are shifted to a low energy level. At this time, stimulated emission of light is generated, and a power of the signal light is gradually increased along the optical fiber, thus effecting amplification of the signal light.

In general, the concentration of atoms doped in the core 2a is uniform with respect to a longitudinal direction and a radial direction of the Er doped fiber 2.

In accordance with the above-mentioned principle of the optical amplification, when the rare earth atoms in the rare earth element doped fiber are excited up to a high energy level by the pumping light, the energy of the pumping light is consumed. Therefore, as being propagated in the rare earth element doped fiber, the power of the pumping light is absorbed. Meanwhile, it is known that if the power of the pumping light is less than a certain threshold level, there does not occur the excitation of the rare earth atoms enough to effect the optical amplification. Accordingly, in the optical amplifier employing the rare earth element doped fiber doped with the rare earth element at a uniform concentration in the core, the doped rare earth element rather causes a power loss of the signal light and the pumping light. Therefore, the conventional optical amplifier having the above construction is considered to be unsuitable for an increase in amplification efficiency (i.e., a degree of amplification of the signal light with respect to the pumping light having a fixed power).

SUMMARY OF THE INVENTION

It is accordingly an object of the present invention to provide an optical amplifier which can solve the above problem in the conventional technique and increase the amplification efficiency.

According to one aspect of the present invention, there is provided an optical amplifier for amplifying a signal light by propagating the signal light and a pumping light in a rare earth element doped fiber doped with a rare earth element, characterized in that a diameter of a rare earth element doped portion of the rare earth element doped fiber is gradually reduced in a direction of propagation of the pumping light. The direction of propagation of the pumping light may be the same as or counter to a direction of propagation of the signal light.

The gradual reduction of the diameter of the rare earth element doped portion in the direction of propagation of the pumping light is attained by extending the rare earth element doped fiber with heat to continuously change the diameter of the rare earth element doped portion. Alternatively, the gradual reduction of the diameter may be attained by connecting in series a plurality of rare earth element doped fibers formed with rare earth element doped portions having different diameters.

According to another aspect of the present invention, there is provided an optical amplifier for amplifying a signal light by propagating the signal light and a pumping light in a rare earth element doped optical waveguide doped with a rare earth element, characterized in that a width of a rare earth element doped portion of the rare earth element doped optical waveguide is gradually reduced in a direction of propagation of the pumping light.

BRIEF DESCRIPTION OF THE DRAWINGS

FIG. 1 is a schematic view showing the principle of optical amplification by a rare earth element doped fiber;

DESCRIPTION OF THE PREFERRED EMBODIMENTS

Figure 2A:
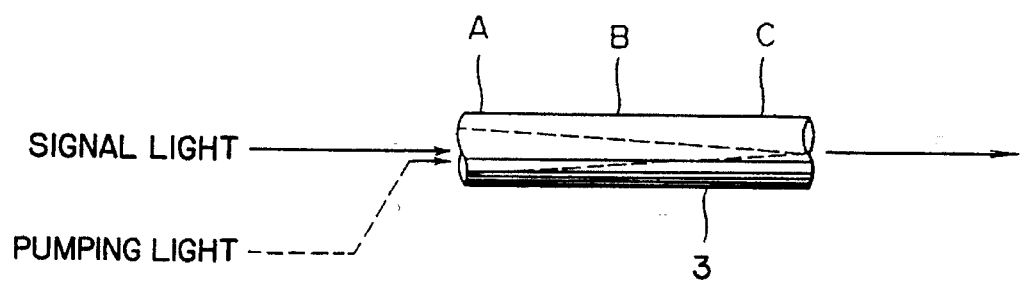
FIGS. 2A and 2B are schematic views showing the principle of the present invention.

There will first be described the principle of the present invention with reference to FIGS. 2A and 2B. FIG. 2A shows a case wherein a signal light and a pumping light are propagated in the same direction in a rare earth element doped fiber 3, and FIG. 2B shows a case that the signal light and the pumping light are propagated in opposite directions in the rare earth element doped fiber 3.

Figure 2B:
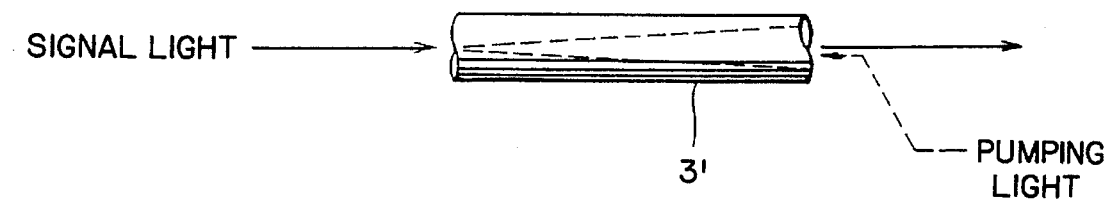

In an optical amplifier for amplifying the signal light by propagating the signal light and the pumping light in the rare earth element doped fiber 3 and 3', a diameter of a rare earth element doped position of the rare earth element doped fiber 3 and 3' is gradually reduced in a direction of propagation of the pumping light as shown by dashed lines in FIGS. 2A and 2B.

Whether the signal light and the pumping light are to be propagated in the same direction in the rare earth element doped fiber 3, or whether the signal light and the pumping light are to be propagated in opposite directions in the rare earth element doped fiber 3', may be selected according to construction requirements of an optical communication system or the like to which the optical amplifier of the present invention is applied.

Figures 3A, 3B, 3C:
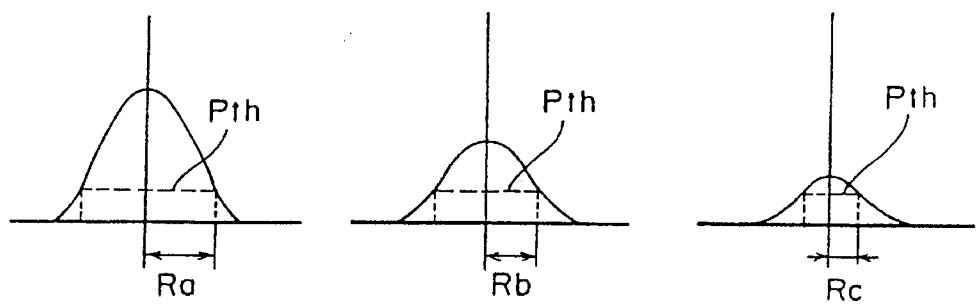
FIGS. 3A, 3B and 3C are graphs for explaining light intensity distributions at various points shown in FIG. 2A.

Referring to FIG. 2A, a point A denotes an upstream position of the direction of propagation of the signal light and the pumping light in the rare earth element doped fiber 3; a point C denotes a downstream position of the direction of propagation; and a point B denotes an intermediate position between the points A and C. FIGS. 3A, 3B and 3C are graphs that show the distributions of intensities of the pumping light at the points A, B and C shown in FIG. 2A, respectively. In each graph, the ordinate represents an electric field amplitude of the pumping light, and the abscissa represents a radial position in the rare earth element doped fiber 3.

As apparent from FIGS. 3A, 3B and 3C each graph gives a so-called Gaussian distribution such that the electric field amplitude of the pumping light at a central position of the fiber 3 in the radial direction is relatively high. Further, it is also understood that a maximum electric field amplitude of the pumping light is gradually reduced in the direction of propagation of the pumping light due to the fact that the rare earth atoms doped in the fiber are excited by the pumping light. In FIGS. 3A, 3B, and 3C reference character Pth denotes a threshold level such that optical amplification is effected at levels higher than the threshold level Pth, while it is not effected at levels not higher than the threshold level Pth. Reference characters Ra, Rb and Rc denote radii of portions giving the electric field amplitude higher than the threshold level Pth at the points A, B and C, respectively. The relation among these radii is given as follows:

$$Rc < Rb < Ra$$

As to the point B, for example, if the rare earth element is doped at a portion radially outside the portion of the radius Rb, such a radially outside portion does not contribute to optical amplification at all, but rather attenuates the pumping light because of the existence of the rare earth element, resulting in difficulty in achieving efficient optical amplification. However, according to the present invention, the diameter of the rare earth element doped portion of the rare earth element doped fiber 3 is gradually reduced in the direction of propagation of the pumping light. Accordingly, any adverse rare earth element doped portion which does not contribute to optical amplification but rather attenuates the pumping light as mentioned above with reference to FIGS. 3A, 3B and 3C can be eliminated or reduced, thus providing an optical amplifier suitable for an increase in amplification efficiency.

Also in the case shown in FIG. 2B, i.e., in the case of so-called backward pumping such that the signal light and the pumping light are propagated in opposite directions, the operation is similar to that in the case of so-called forward pumping shown in FIG. 2A.

There will now be described a first preferred embodiment of the present invention.

Figure 4:
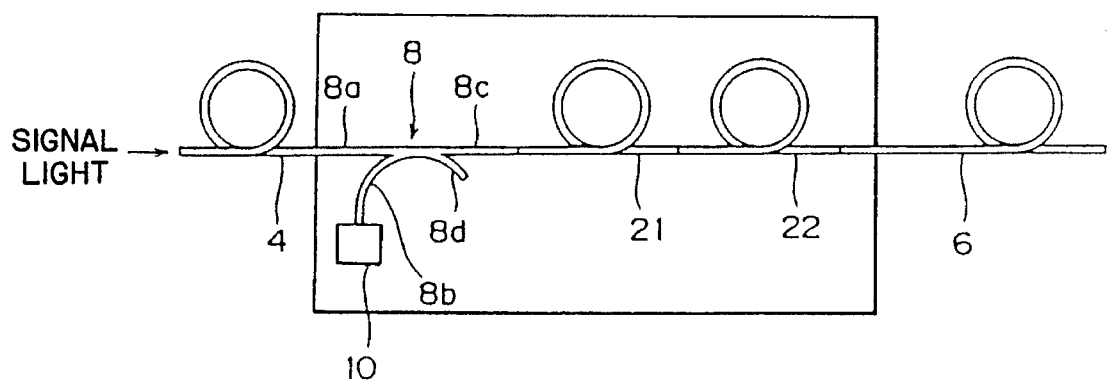
FIG. 4 is a schematic illustration of a construction of the optical amplifier according to a first preferred embodiment of the present invention.

FIG. 4 shows a construction of an optical fiber amplifier according to the first preferred embodiment of the present invention. Referring to FIG. 4, a plurality of (two in this preferred embodiment) rare earth element doped fibers 21 and 22, different in diameter at the respective rare earth element doped portions, are connected together in series, so that the diameter of the rare earth element doped portion of the rare earth element doped fiber as a whole is gradually reduced in the direction of propagation of the pumping light. The connection of the rare earth element doped fibers 21 and 22 is carried out by splicing, for example. Further, an input optical fiber 4 for propagating a signal light to be amplified and an output optical fiber 6 for propagating the signal light amplified are connected by splicing or the like to opposite ends of the rare earth element doped fibers 21 and 22 connected together in series.

An optical coupler 8 of a fiber spliced type is formed at a midway portion of the input optical fiber 4 by splicing a side surface of another optical fiber to a side surface of the input optical fiber 4 and extending a spliced portion by heating. The optical coupler 8 includes a first input port 8a and a first output port 8c via the input optical fiber 4, and also includes a second input port 8b and a second output port 8d via the other optical fiber. A semiconductor laser 10 as a pumping light source is connected to the second input port 8b.

In the case wherein the doped rare earth element is erbium (Er), and a signal light having a wavelength within the 1.55 μm band is intended to be amplified, a wavelength of the pumping light is selected to be within the 0.80 μm band, 0.98 μm band, 1.48 μm band, etc. The structural parameters of the optical coupler 8 are set so as to efficiently input the pumping light and the signal light thus selected into the rare earth element doped fiber. That is, so as to introduce substantially 100% of the signal light input into the first input port 8a to the first output port 8c, and similarly introduce substantially 100% of the pumping light input into the second input port 8b to the first output port 8c.

Figure 5A:
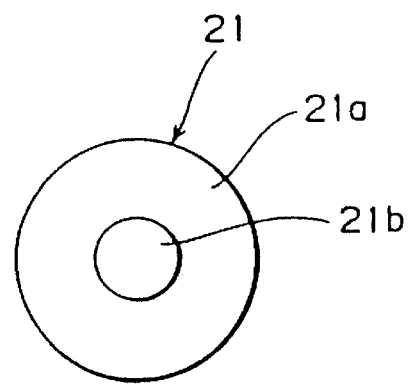
FIGS. 5A and 5B are sectional views of an upstream fiber and a downstream fiber, respectively, shown in FIG. 4.
Figure 5B:
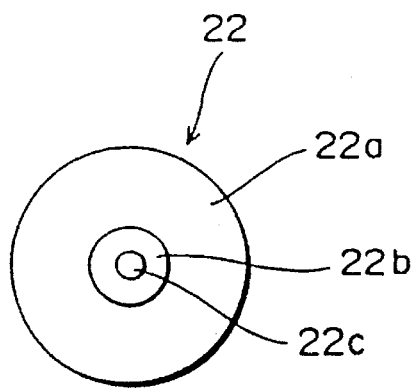

The rare earth element doped fiber 21 located on the upstream side with respect to the direction of propagation of the signal light and the pumping light will be hereinafter referred to as an upstream fiber 21, and the rare earth element doped fiber 22 located on the downstream side will be hereinafter referred to as a downstream fiber 22. The upstream fiber 21 and the downstream fiber 22 are shown in FIGS. 5A and 5B in cross section, respectively. The upstream fiber 21 is comprised of a clad 21a and a core 21b having a refractive index higher than that of the clad 21a. Er is doped in the core 21b with a uniform concentration distribution. The downstream fiber 22 is comprised of a clad 22a, a first core 22b and a second core 22c. A refractive index distribution in the first core 22b and the second core 22c of the downstream fiber 22 is the same as that in the core 21b of the upstream fiber 21. A refractive index of the clad 22a of the downstream fiber 22 is the same as that of the clad 21a of the upstream fiber 21.

The second core 22c is formed at a central portion of the first core 22b, and Er is doped in the second core 22c only with a uniform concentration distribution. As a method of doping a rare earth element in a specific portion of a core as in the downstream fiber 22, the following method may be adopted, for instance. That is, in producing a preform by an MCVD process, a first core glass not doped by a rare earth element is formed on an inner wall of a silica tube, and a second core glass doped with a rare earth element is formed on the first core glass.

Although the two rare earth element doped fibers, that is, the upstream fiber 21 and the downstream fiber 22 are used in this preferred embodiment, several (more than two) rare earth element doped fibers formed with rare earth element doped portions having different diameters may be produced according to the above-mentioned method of producing the downstream fiber 22, and these rare earth element doped fibers may be connected together in series so that the diameters of the rare earth element doped portions become smaller in the direction of propagation of the pumping light. Further, although the concentration distribution of Er is uniform in the radial direction of the doped portion in this preferred embodiment, the concentration distribution of the rare earth element doped may be modified such that the concentration is high at the radially central area of the doped portion like the intensity distribution of the pumping light, so as to make the optical amplification efficient.

In the optical fiber amplifier shown in FIG. 4, the signal light from the input optical fiber 4 and the pumping light from the semiconductor laser 10 are coupled together by the optical coupler 8, and they are input into the upstream fiber 21. In the upstream fiber 21, the signal light is amplified by the pumping light which has not yet been absorbed but has a sufficient intensity. At the outlet of the upstream fiber 21, the intensity of the pumping light becomes relatively small as the result of the amplification of the signal light. Then, the pumping light having a relatively small intensity and the amplified signal light are input into tile downstream fiber 22. In the downstream fiber 22, undesired absorption of the pumping light does not occur because the diameter of the Er doped second core 22c of the downstream fiber 22 is smaller than the diameter of the core 21b of the upstream fiber 21. As a result, the optical amplification of the signal light can be efficiently carried out. Also in the case of applying this principle to an optical waveguide, the optical amplification can be similarly carried out by connecting a series a of optical waveguide boards formed with Er doped optical waveguides having different widths.

Figure 6:
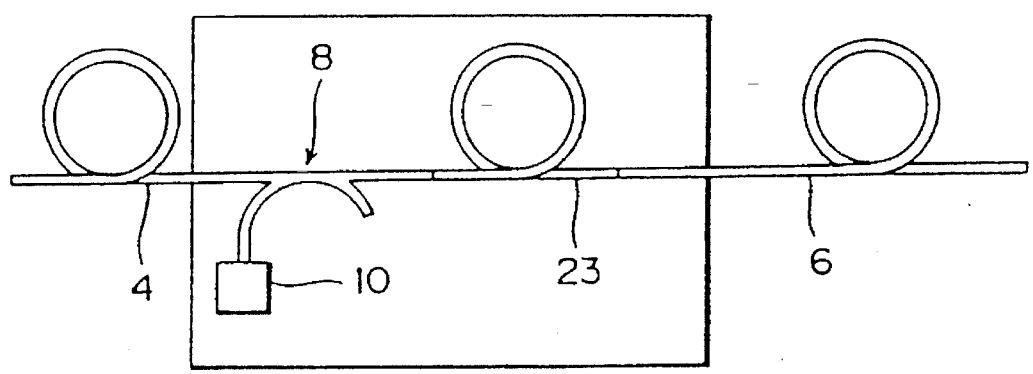
FIG. 6 is a schematic illustration of a construction of the optical amplifier according to a second preferred embodiment of the present invention.

FIG. 6 shows a construction of an optical fiber amplifier according to a second preferred embodiment of the present invention, in which the same parts as those in the first preferred embodiment are designated by the same reference numerals. Referring to FIG. 6, a rare earth element doped fiber 23 is substituted for the upstream fiber 21 and the downstream fiber 22 used in the first preferred embodiment.

Figure 7A:
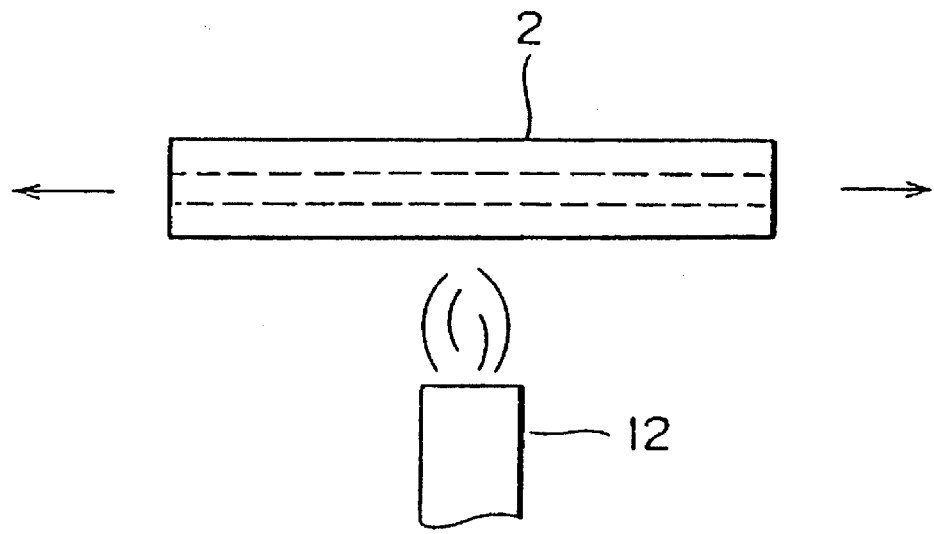
FIGS. 7A and 7B are views explaining a manufacturing method of an extended fiber shown in FIG. 5.
Figure 7B:
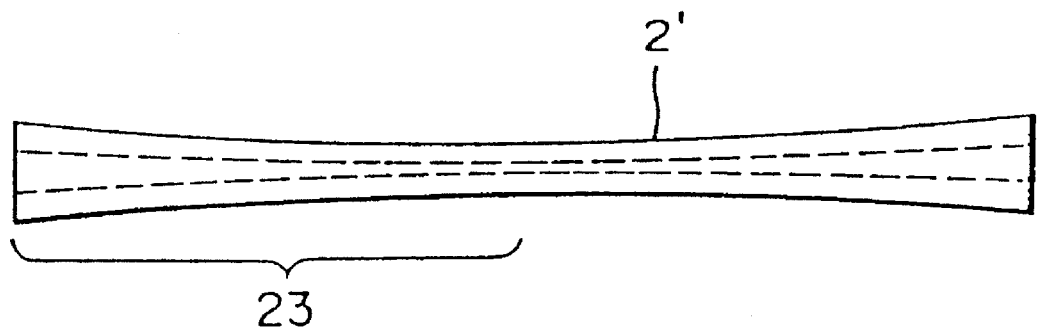

The rare earth element doped fiber 23 is formed with a rare earth element doped portion having a diameter that changes continuously. That is, the diameter of the rare earth element doped portion of the rare earth element doped fiber 23 is continuously reduced in the direction of propagation of the pumping light. As a method of continuously reducing the diameter of the rare earth element doped portion, the following method may be employed, for example. As shown in FIG. 7A, a rare earth element doped fiber 2 having a given length is heated at its substantially axially central portion by a burner 12, and is then extended in opposite directions as depicted by arrows. As a result, a rare earth element doped fiber 2' as shown in FIG. 7B is formed. As apparent from FIG. 7B, a diameter of the axially central portion of the rare earth element doped fiber 2' is smaller than that of the opposite end portions. Then, the rare earth element doped fiber 2' is cut at the axially central portion to thereby obtain the rare earth element doped fiber 23 (extended fiber) formed with the Er doped portion having a diameter continuously reduced. In FIGS. 7A and 7B, elongated areas surrounded by dashed lines represent the Er doped portions of the rare earth element doped fibers 2 and 2'.

According to the second preferred embodiment, the diameter of the rare earth element doped portion of the rare earth element doped fiber is continuously changed. Therefore, as compared with the first preferred embodiment wherein the diameter of the rare earth element doped portion is stepwise changed, the optical fiber amplifier according to the second preferred embodiment can further improve the amplification efficiency.

In the first and second preferred embodiments as described above, the signal light and the pumping light are propagated in the same direction in the rare earth element doped fiber. However, the signal light and the pumping light may be propagated in the opposite directions in the rare earth element doped fiber.

Figure 8:
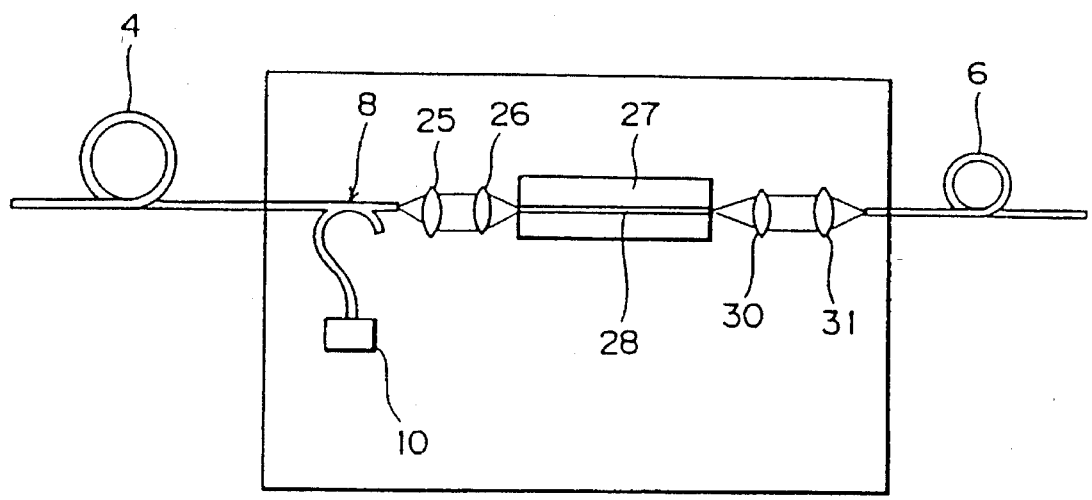
FIG. 8 is a schematic illustration of a construction of the optical amplifier according to a third preferred embodiment of the present invention.
Figure 9:
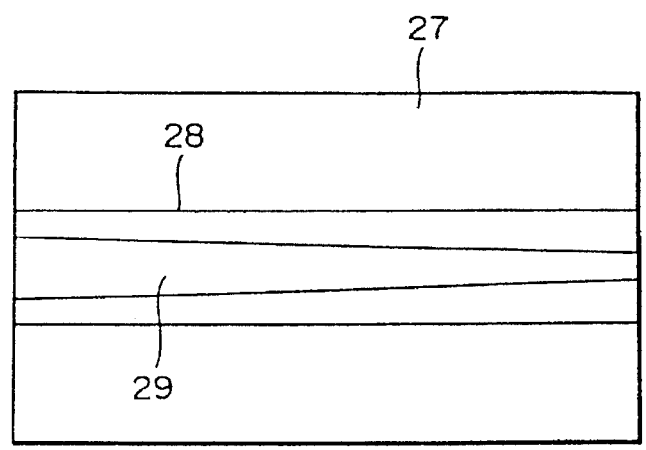
FIG. 9 is an enlarged view of an optical waveguide shown in FIG. 8.

There will now be described a third preferred embodiment of the present invention with reference to FIG. 8 employing a rare earth element doped optical waveguide which is doped with a rare earth element such as Er. Referring to FIG. 8, a signal light input from the input optical fiber 4 and a pumping light emitted from the semiconductor laser (LD) 10 are coupled together by the optical coupler 8. Then, the signal light and the pumping light thus coupled are condensed by a pair of lenses 25 and 26 to reach an optical waveguide 28 formed on an optical waveguide board 27. As shown in FIG. 9, an Er doped portion 29 is formed in the optical waveguide 28 so as to be gradually reduced in width in the direction of propagation of the pumping light. The formation of the Er doped portion 29 in the optical waveguide 28, as controlling the width of the Er doped portion 29, can be carried out by a thermomigration process, for example. In this preferred embodiment, the pumping light input into the optical waveguide 28 loses an energy upon excitation of Er in the optical waveguide 28 up to a high energy level, and a power of the pumping light is attenuated as propagating in the optical waveguide 28. According to this preferred embodiment, since the width of the Er doped portion 29 in the optical waveguide 28 is continuously reduced in concert with the attenuation of the power of the pumping light, absorption of the pumping light having an intensity lower than a threshold by Er in the optical waveguide 28 can be prevented. After being amplified in the optical waveguide 28, the amplified signal light is condensed by a pair of lenses 30 and 31 to reach the output optical fiber 6.

Figure 10:
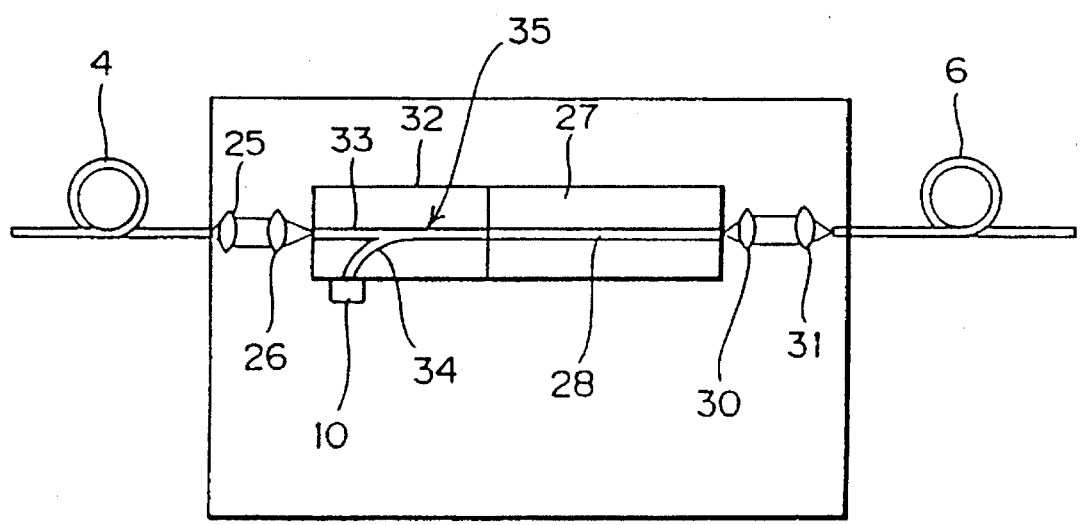
FIG. 10 is a schematic illustration of a construction of the optical amplifier according to a fourth preferred embodiment of the present invention.

FIG. 10 shows a construction of an optical amplifier employing a rare earth element doped optical waveguide according to a fourth preferred embodiment of the present invention. Referring to FIG. 10, an optical coupler 35 of a waveguide type is employed, so as to make a structure of the optical amplifier integratable. More specifically, an optical waveguide 33 for receiving a signal light from the input optical fiber 4 through the lenses 25 and 26 and an optical waveguide 34 for receiving a pumping light from the semiconductor laser (LD) 10 are formed on an optical waveguide board 32. The signal light and the pumping light propagated in the optical waveguides 33 and 34 are coupled together by the coupler 35, and they are then input into the Er doped optical waveguide 28 formed on the optical waveguide board 27. Both the optical waveguide boards 27 and 32 are bonded together by an optical adhesive or the like so as to align the optical waveguide of the coupler 35 to the waveguide 28.

Although the third and fourth preferred embodiments shown in FIGS. 8 and 10 have been directed to the forward pumping such that the pumping light and the signal light are propagated in the same direction in the rare earth element doped optical waveguide, the present invention may be applied to the backward pumping such that the pumping light and the signal light are propagated in opposite directions in the rare earth element doped optical waveguide.

According to the present invention as described above, since the diameter of the rare earth element doped portion of a rare earth element doped fiber is gradually reduced in the direction of propagation of the pumping light, an optical amplifier suitable for an increase in amplification efficiency can be provided. Such a feature can be similarly obtained by using a rare earth element doped optical waveguide.

Such an increase in amplification enables the use of a semiconductor laser of a relatively low power as the pumping light source. Furthermore, in the case wherein the power of the semiconductor laser is fixed, a length of the rare earth element doped fiber to be employed can be reduced owing to the increase in amplification efficiency, thereby providing a compact optical amplifier.

What is claimed is:

1. An optical amplifier for amplifying a signal light by propagating the signal light and a pumping light in a rare earth element doped fiber having a core and a cladding, comprising:

means for inputting the pumping light into said rare earth element doped fiber;

means for inputting the signal light into said rare earth element doped fiber; and an optical amplifying portion of said rare earth element doped fiber having a rare earth element doped portion in said core of said optical amplifying portion of said rare earth element doped fiber, said optical amplifying portion being connected with said means for inputting the pumping light and said means for inputting the signal light so that said signal light and said pumping light propagate through said optical amplifying portion, and a ratio of a diameter of said rare earth element doped portion to a diameter of said core being gradually reduced in a direction of propagation of said pumping light to thereby amplify said propagating signal light.

2. An optical amplifier as defined in claim 1, further comprising:

an input optical fiber to receive said signal light from said means for inputting said signal light; and an output optical fiber connected to a first end of said rare earth element doped fiber to output the amplified signal light, and wherein said means for inputting the pumping light includes a pumping light source to supply said pumping light, and said means for inputting the pumping light and said means for inputting the signal light include an optical coupler connected to a second end of said rare earth element doped fiber, said input optical fiber and said pumping light source, to introduce said signal light and said pumping light into said optical amplifying portion.

3. An optical amplifier for amplifying a signal light by propagating the signal light and a pumping light in a rare earth element doped optical waveguide, comprising:

means for inputting the pumping light into said rare earth element doped optical waveguide;

means for inputting the signal light into said rare earth element doped optical waveguide; and an optical amplifying portion of said rare earth element doped optical waveguide having a rare earth element doped in an inner portion of said optical amplifying portion of said rare earth element doped optical waveguide, said optical amplifying portion being connected with said means for inputting the pumping light and said means for inputting the signal light so that said signal light and said pumping light propagate through said optical amplifying portion, and a ratio of a width of said rare earth element doped inner portion to a width of said optical waveguide being gradually reduced in a direction of propagation of said pumping light to thereby amplify said propagating signal light.

4. An optical amplifier as defined in claim 3, further comprising:

an input optical fiber to receive said signal light; and an output optical fiber connected to a first end of said rare earth element doped optical waveguide to output the amplified signal light, and wherein said means for inputting the pumping light includes a pumping light source to supply said pumping light, and said means for inputting the pumping light and said means for inputting the signal light include an optical coupler connected to a second end of said rare earth element doped optical waveguide, said input optical fiber and said pumping light source, to introduce said signal light and said pumping light into said optical amplifying portion.

5. The optical amplifier as defined in claim 1, wherein:

said signal light and said pumping light are propagated in the same direction in said rare earth element doped fiber.

6. The optical amplifier as defined in claim 1, wherein:

said signal light and said pumping light are propagated in opposite directions relative to each other in said rare earth element doped fiber.

7. The optical amplifier as defined in claim 1, wherein:

said rare earth element doped fiber comprises a plurality of rare earth element doped fibers connected together in series, said plural rare earth element doped fibers being formed with rare earth element doped portions having different diameters.

8. The optical amplifier as defined in claim 1, wherein:

the diameter of said rare earth element doped portion is continuously changed by heat extension of said rare earth element doped fiber.

9. The optical amplifier as defined in claim 3, wherein:

said signal light and said pumping light are propagated in the same direction in said rare earth element doped optical waveguide.

10. The optical amplifier as defined in claim 3, wherein:
said signal light and said pumping light are propagated in opposite directions relative to each other in said rare earth element doped optical waveguide.

11. The optical amplifier as defined in claim 3, wherein:
said rare earth element doped optical waveguide comprises a plurality of rare earth element doped optical waveguides connected together in series, said plural rare earth element doped optical waveguides being formed with rare earth element doped portions having different widths.

12. An optical amplifier as defined in claim 4, wherein:
said optical coupler is a waveguide type optical coupler.

* * * * *

UNITED STATES PATENT AND TRADEMARK OFFICE
CERTIFICATE OF CORRECTION

PATENT NO. : 5,508,842
DATED : April 16, 1996
INVENTOR(S) : Keiko TAKEDA, et al.

It is certified that error appears in the above-indentified patent and that said Letters Patent is hereby corrected as shown below:

Column 1, line 20, after "photodiode, insert a comma (",");
    Line 22, after "Thereafter", insert a comma (",");
    Line 24, after "like", insert a comma (",");
    Line 25, delete "line, if" and insert therefor --line.  If--;
    Line 61, after "of", insert --Er--.

Column 3, line 2, delete "5" and insert therefor --6--;
    Line 19, delete "that" and insert therefor --wherein--;
    Line 21, delete "3" and insert therefor --3'--;
    Line 50, after "3C", insert a comma (",").

Signed and Sealed this

Sixth Day of August, 1996

Attest:

BRUCE LEHMAN

Attesting Officer      Commissioner of Patents and Trademarks